United States Patent
Wiszniewski et al.

(10) Patent No.: US 10,334,664 B2
(45) Date of Patent: Jun. 25, 2019

(54) ELECTRIC WATER-HEATER WITH ADJUSTABLE POWER

(71) Applicant: Electricite De France, Paris (FR)

(72) Inventors: David Wiszniewski, Saint Mammes (FR); Remi Denis, Le Plessis Robinson (FR); Anne-Sophie Coince, Avon (FR); Stephane Bernasconi, Thomery (FR)

(73) Assignee: ELECTRICITE DE FRANCE, Paris (FR)

( * ) Notice: Subject to any disclaimer, the term of this patent is extended or adjusted under 35 U.S.C. 154(b) by 282 days.

(21) Appl. No.: 15/124,997

(22) PCT Filed: Mar. 10, 2015

(86) PCT No.: PCT/EP2015/054971
§ 371 (c)(1),
(2) Date: Sep. 9, 2016

(87) PCT Pub. No.: WO2015/135945
PCT Pub. Date: Sep. 17, 2015

(65) Prior Publication Data
US 2017/0027023 A1    Jan. 26, 2017

(30) Foreign Application Priority Data
Mar. 11, 2014  (FR) .................................. 14 52022

(51) Int. Cl.
A47J 27/00 (2006.01)
F24H 9/20 (2006.01)
(Continued)

(52) U.S. Cl.
CPC ......... H05B 1/0244 (2013.01); F24H 9/2014 (2013.01); G05D 23/1924 (2013.01);
(Continued)

(58) Field of Classification Search
None
See application file for complete search history.

(56) References Cited

U.S. PATENT DOCUMENTS 4,241,237 A * 12/1980 Paraskevakos ...... H04M 11/002
                                                          340/870.02
4,419,666 A * 12/1983 Gurr ........................ H02J 3/14
                                                               307/39
(Continued)

FOREIGN PATENT DOCUMENTS

| EP | 2485189 A1 | 8/2012 |
| EP | 2660943 A1 | 6/2013 |
| KR | 1020130049288 A | 5/2013 |

OTHER PUBLICATIONS

French Search Report with English Language Translation Cover Sheet dated Oct. 13, 2014, Application No. PCT/EP2015/054971.
(Continued)

*Primary Examiner* — Thor S Campbell
(74) *Attorney, Agent, or Firm* — Womble Bond Dickinson (US) LLP

(57) ABSTRACT

The invention relates to a system (1) comprising:
   a heating device (11) comprising at least one heating means (110) supplied by an AC power grid (2);
   a control module (12) for controlling said heating device (11),
the system being characterized in that the heating means (110) is supplied via a switching converter (120) rectifying the alternating current of the grid (2) into direct current, the switching converter (120) being controlled by the control module (12) in accordance at least with descriptive data of a state of said power grid (2), so as to adjust the power of the heating means (110).

11 Claims, 2 Drawing Sheets

(51) Int. Cl.
*H02J 5/00* (2016.01)
*H05B 1/02* (2006.01)
*G05D 23/19* (2006.01)
*H02J 3/14* (2006.01)
*F24D 17/00* (2006.01)
*F24D 19/10* (2006.01)

(52) U.S. Cl.
CPC ............ *H02J 5/00* (2013.01); *F24D 17/0021* (2013.01); *F24D 19/1051* (2013.01); *H02J 3/14* (2013.01); *H02J 2003/143* (2013.01); *H05B 2203/021* (2013.01); *Y02B 30/762* (2013.01); *Y02B 70/3275* (2013.01); *Y04S 20/244* (2013.01)

(56) References Cited

U.S. PATENT DOCUMENTS

| | | | | | |
|---|---|---|---|---|---|
| 4,455,453 | A | * | 6/1984 | Parasekvakos | H04M 11/002 340/3.3 |
| 4,977,515 | A | * | 12/1990 | Rudden | G05D 23/1913 340/3.31 |
| 5,168,170 | A | * | 12/1992 | Hartig | H02J 3/14 307/34 |
| 5,502,339 | A | * | 3/1996 | Hartig | H02J 3/14 307/31 |
| 8,674,823 | B1 | * | 3/2014 | Contario | H02J 1/10 340/333 |
| 9,002,185 | B2 | * | 4/2015 | Kreutzman | F24D 11/004 392/441 |
| 10,072,853 | B2 | * | 9/2018 | Chaudhry | F24D 19/1075 |
| 2001/0010032 | A1 | * | 7/2001 | Ehlers | G05B 15/02 702/62 |
| 2012/0024240 | A1 | * | 2/2012 | Beckley | F24H 1/18 122/14.2 |
| 2012/0232706 | A1 | | 9/2012 | Hayashida | |
| 2013/0024029 | A1 | * | 1/2013 | Tran | G16H 50/20 700/278 |
| 2017/0324246 | A1 | * | 11/2017 | Sato | H01M 10/44 |
| 2018/0075548 | A1 | * | 3/2018 | Madonna | G06Q 30/0283 |

OTHER PUBLICATIONS

Written Opinion of International Searching Authority with English Language Translation dated May 21, 2015, PCT Application No. PCT/EP2015/054971.

International Search Report and Written Opinion with English Language Translation, dated May 21, 2015, PCT Application No. PCT/EP2015/054971.

\* cited by examiner

ELECTRIC WATER-HEATER WITH ADJUSTABLE POWER

GENERAL TECHNICAL FIELD

The present invention relates to a water heater type system with an adjustable energy capacity.

STATE OF ART

The "energy mix" refers to the distribution of the different sources consumed to produce electrical energy. This energy mix, constantly evolving, witnesses the constant advance of Renewable Energies, which leads to an increased need for flexibility of the power systems.

The latter, essentially represented by wind power and photovoltaics do not indeed enable a constant adjusted production contrary to a nuclear plant, hence variability and predictability problems of the associated production. This means that very short term hazards will strongly increase.

Furthermore, local problems of supply quality will be amplified due to an inhomogeneous geographical distribution of the facilities, with for example more photovoltaics in the South and wind power in the North.

It seems essential to find solutions for driving the associated load in order to overcome the hazard related to the Reviewable Energies and to satisfy the constraints of the power grid in the broad sense.

For example, it has been suggested charging stationary batteries to facilitate the massive insertion of photovoltaic panels ("NiceGrid" demonstrator). However, the high capital costs do not enable a large scale deployment of this alternative solution to be considered. It is also provided to act on the reactive power provided by photovoltaic panels to adjust the voltage. However, this last approach does not meet the issues of overcoming the wind power hazard.

Alternatively to storage via batteries, it is possible to thermally store the energy. With nearly 12 million units installed in France more than 80% of which are regulated by the pricing signal peak hours/off-peak hours (HP/HC), the stock of home thermal storage joule water heater (CEJ)—used nowadays for daily smoothing the load curve—is likely to meet these new issues.

In this regard, US patent application 2009/0188486 provides water heaters supplied with direct current by photovoltaic modules. The system is configured to maximise the solar fraction, that is to minimise the consumption of power drawn off from the grid while maintaining the comfort for the user.

This system is satisfactory, but only partially resolves the problem: there may indeed be a day with an excess of electrical energy coming from the photovoltaic panel, and the next day with a cloudy weather requiring the consumption of another power source. Moreover, the system is complex and can only be used in houses fitted with a solar panel.

We know techniques referred to as "load shedding" described for example in the application WO2012/172193, which enable an electrical appliance such as a radiator to be automatically cut off in case of an energy consumption peak. However, these techniques do not offer a solution in case of a production peak of photovoltaic origin, and can degrade the comfort of the consumers.

Thus, today, no satisfactory solution is available to drive efficiently on a large scale the load related to the electrical energies of renewable origin. It would be desirable to have a way to use the storing capacity of joule water heaters which would be easily deployable, efficient and not expensive.

DISCLOSURE OF THE INVENTION

The purpose of the invention is to overcome these drawbacks by providing, according to a first aspect, a system comprising:
- a heating device comprising at least one heating means supplied by an AC power grid;
- a control module of said heating device, the system being characterised in that the heating means is supplied via a switching converter rectifying the alternating current of the grid into direct current, the switching converter being controlled by the control module in accordance at least with descriptive data of a state of said power grid, so as to adjust the power of the heating means.

The device according to the invention is advantageously completed by the following characteristics, taken individually or in any of their technically possible combinations:
- the system further comprises a water tank, the heating device heating the water of the tank;
- the system further comprises a managing element configured to control the control module in accordance with said descriptive data of a state of said power grid;
- the control module controls each power device in accordance with a power set point issued by the managing element;
- the managing element is configured to issue a power set point reducing the consumption of the heating means when the descriptive data of a state of said power grid are characteristic of a present deficit and/or of a future excess amount of energy of renewable origin within said power grid, so as to reduce the energy capacity of the water tank;
- the control module is configured to ignore the power set point when a temperature of the water in the tank is lower than a first predefined threshold;
- the managing element is configured to issue a power set point increasing the consumption of the heating means when the descriptive data of a state of said power grid are characteristic of a present excess amount and/or a future deficit of energy of renewable origin within said power grid so as to increase the energy capacity of the water tank;
- the control module is configured to ignore the power set point when a temperature of the water in the tank is higher than a second predefined threshold;
- the system further comprises an appliance receiving said descriptive data of a state of said power grid from a communication network, the appliance being connected to said managing element or to the control module;
- the heating means has a rated output higher than 1.2 kW;
- the switching converter comprises a rectifier and a chopper;
- the rectifier of the switching converter comprises a diode bridge;
- the chopper of the switching converter comprises at least one operated switching transistor, a microcontroller of said transistor connected to the controlled module, at least one diode, and at least one filtering reactive element;
- each operated switching transistor is selected from the metal oxide semiconducting field effect transistors (MOSFET) and the insulated gate bipolar transistors (IGBT), and each filtering reactive element is selected from the capacitors and inductors;

the system further comprises a short-circuit means of the switching converter controlled by the control module.

According to a second aspect, the invention relates to a method for modifying the consumption of a heating device, the method being characterised in that it comprises the steps of:

receiving descriptive data of a state of an AC power grid;

generating by a managing element a power set point in accordance at least with said descriptive data of a state of said power grid;

issuing said set point to a control module of a heating means of the heating device, the heating means being supplied by the power grid via a switching converter rectifying the alternating current of the grid into direct current;

controlling by the control module the switching converter in accordance with the power set point so as to adjust the power of the heating means.

DISCLOSURE OF THE FIGURES

Further characteristics, objects and advantages of the invention will appear from the following description, which is purely illustrative and not limiting, and which must be read with reference to the appended drawings in which.

DETAILED DESCRIPTION

General Architecture

Figure 1:
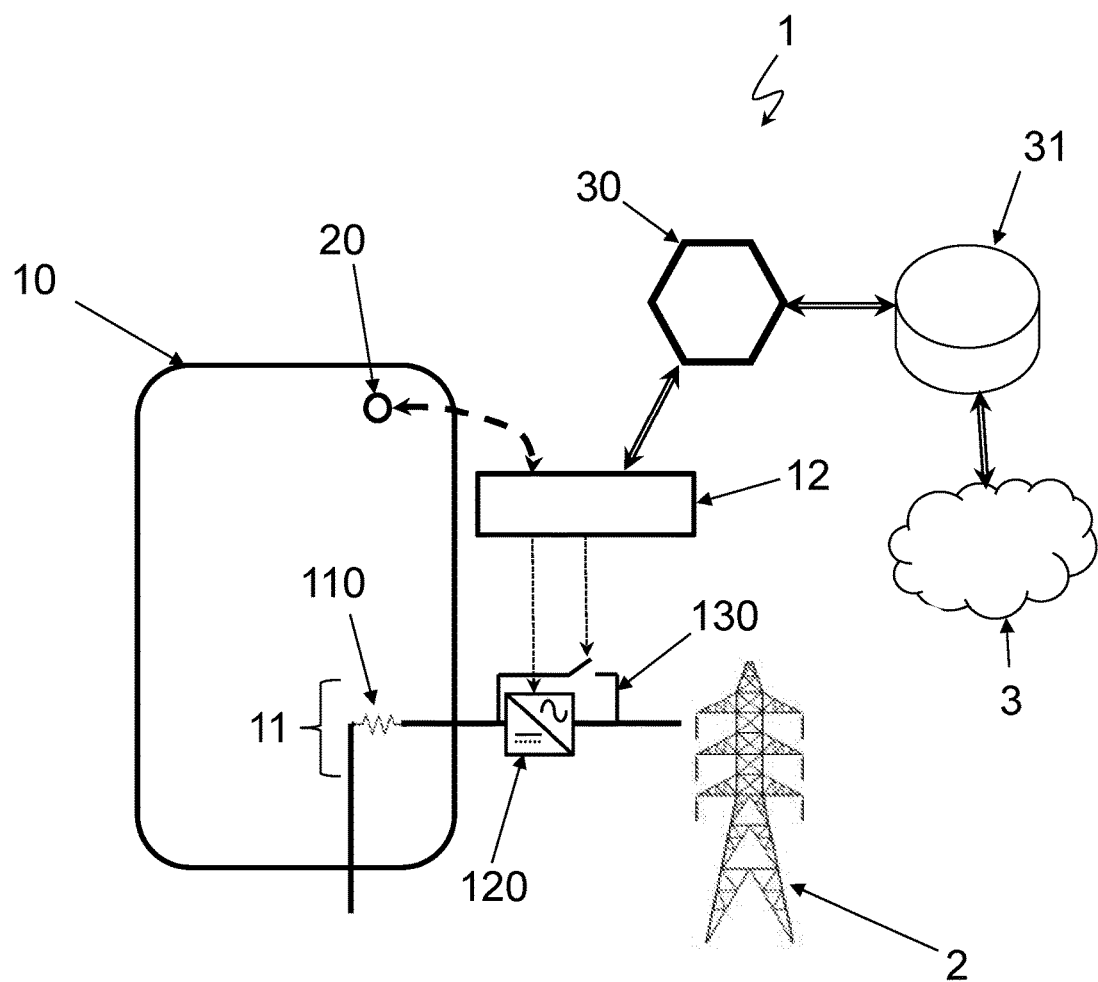
FIG. 1 is a diagram of a preferred embodiment of a system according to the invention.

FIG. 1 depicts the general architecture of a preferred embodiment of the system 1 according to the invention. This system is essentially made of one or more heating devices 11 comprising at least one heating means 110 supplied by a power grid 2. It is typically a 230V AC home grid.

These heating devices 11, or "emitters", are typically home radiators. A joule effect heating means 110 is typically one or more electrical resistors which heat air or a heat transfer fluid (for example oil), in thermal exchange with an environment to be heated such as the air of a room of an accommodation. Furthermore, two devices 11 can indeed be part of a same emitter.

Preferably, the heated fluid is water (in particular the water of a tank 10), and the system is thus a home joule water heater (CEJ) (44% of the housings are fitted therewith). In the continuation of the present description, the example of the water heater type system will be taken, but it will be understood that the invention is not limited to the latter, and applies to any system comprising at least one heating device 11.

A CEJ conventionally comprising:

a water tank 10 (commonly referred to as a hot water "cylinder");

a device for heating 11 the water in the tank 10, the device 11 comprising a heating means 110 supplied by a power grid 2;

typically a temperature probe 20 configured to emit a signal representative of the temperature of the water in the tank 10;

a control module 12 of said heating device 11 in accordance with said signal emitted by the probe 20.

The one or more electric heating means 110 of the heating device 11 are in particular joule effect heating means, that is generally resistors, hence the heating of water by the joule effect. Alternatively, a means 110 can be a whole heat pump the hot source of which is in thermal exchange with the water in the tank 10 (and the cold source in a thermal exchange for example with the outside air), so as to enable the water to be heated with an efficiency higher than 100%.

Preferably, the device 11 is fully electric (it thus only comprises heating means supplied by the grid 2, and no gas burners for example). The heating energy supplied to the water is then totally of electrical origin. The system is however not limited to this configuration and the device 11 can alternatively further comprise an alternative heating means (non-electrical) such as a burner, an exchanger with a solar collector, etc.

More preferably, the device 11 comprises a single high-power heating means 110, as will be seen later.

The grid 2 is a large scale grid which connects a plurality of power sources. As previously explained, it is both energy of non-renewable origin (nuclear and/or fossil) and energy of renewable origin (solar, wind, etc.). The energy of renewable origin has reliability and predictability problems, whereas the energy of non-renewable origin has a better availability.

Assuming that the user of the system 1 comprises a personal source of energy of renewable origin (for example photovoltaic panels on the roof), it is understood that the grid 2 encompasses both the global power grid and the local power grid of the user (in other words either one of the remote plants and the local solar panels can supply the heating device 11).

The system 1 is in a "normal" temperature regulated operating mode. To do so, it advantageously comprises one or more temperature probes 20 and a control module 12 of the heating device 11. The one or more probes 20 permanently or intermittently send a signal representative of the temperature of the water in the tank 10. This signal can be a sending of data digitally representing the temperature, or an electrical signal a parameter of which is a function of the temperature.

The control module 12 is typically an electronic board which triggers or not heating as a function of the water temperature and many other possible parameters (programming, season, time slots, peak hours/off-peak hours, regular uses of the user, etc.).

Generally, a joule water heater most often comprises two threshold temperatures (the value of which can vary according to the time and personal adjustments): a first threshold temperature which is the "minimum" temperature and a second threshold temperature which is the "maximum" temperature (the first threshold is lower than the second threshold). Both thresholds are a few degrees around (for example+/−4° C.) a "comfort" temperature which is the desired mean temperature, adjusted by the user (the interval 50-60° C. is common).

The control module 12 is thus configured to activate the heating device 11 when the received signal is representative of a temperature lower than the first predefined threshold, and/or configured to deactivate the heating device 11 when the received signal is representative of a temperature higher than the second predefined threshold.

Thus, as long as the heating device 11 is switch off and when between both thresholds, nothing happens. If the temperature drops (over time or because the user draws hot water) and passes below the first threshold, the heating device 11 is activated, and this until it reaches the second threshold (maximum temperature higher than the first threshold). Then the temperature drops again, etc. In other words, there are alternating "cooling" phases during which the temperature lowers from the second threshold to the first threshold (or even beyond if the user goes on using hot water), and "heating" phases during which the temperature raises under the effect of the switched on device 11 by a temperature lower than or equal to the first threshold up to the second threshold.

As explained above, this configuration can depend on other parameters, and there can be more than two thresholds, which are possibly moving, for example so as to optimise the energy consumption during the off-peak hours (the water heaters are often provided to preferentially raise the water temperature early in the morning, so as to maximise the use of off-peak hours and have hot water in sufficient amount at shower time).

In practice, the first and second thresholds are often the consequence of hysteresis phenomenon around a median value, which defines both these thresholds. The induced deviation is then about 3° C.

The present invention is limited to no particular configuration, it would be understood that the control module 12 generally regulates the temperature of the tank 10 via the activation/deactivation of the heating device 11 in accordance with signals emitted thereto, signals which can represent operating temperatures and/or set points.

Switching Converter

The heating means 110 (and preferably each heating means or even all the electrical elements of the device 11) is supplied via a switching (or "switched-mode") converter 120. This means that the switching converter 120 is interposed between the grid 2 and the heating means 110, so as to supply electricity thereto in accordance with an intensity and/or a voltage (in particular only the voltage) possibly different from those of the power grid 2.

A switching converter is indeed a power device type, that is a component enabling the power of the heating means 10 it supplies to be modified. In particular, a power converter modifies the intensity and/or the voltage (in particular both proportionally at the same time) on the branch so as to dose out the effective power consumed by the heating means 110 between 0 and 100% of its rated value (i.e. its maximum power). In other words, to a heating means with a rated power P, an effective power Peff=A*P is associated, where A is the variable power ratio of the switching converter.

Many power devices are known, ranging from relays (i.e. devices with an on/off operation of the switch type for which the associated power ratio A is 0 (off state) or 1 (on state)) to complex supplies. A relay can conventionally be electro-mechanical, but also with semiconductors (static relays, see below).

A converter is a device able to modify an electrical signal with the aim of continuously varying its output voltage (or nearly, the median frequency switched converters do have discrete states but the instantaneous average at the grid frequency of these discrete states (after filtering) enables a continuous driving. By contrast, a relay varies the voltage in a purely discrete way). The associated power ratio A has a value in the interval [0; 1].

Switching converter means an electric power converter in which regulation is provided by electro-technical components used in commutation (in particular transistors), that is switching, i.e. passing at a high frequency (a few hundreds of Hz to a few tens of kHz) from an off state to an on state. The switching converters are referred to as modulation devices contrasting with linear converters in which the electro-technical components are used in a linear mode (that is without discontinuities in the output direct current resulting from the switching).

The present converter 120 is a converter rectifying the alternating current of the power grid 2 (house current 230V) into direct current. More precisely, the switching converter 120 of the system 1 comprises a rectifier 140 (pure AC-DC converter, i.e. with a constant power) and a chopper 130 (DC-DC converter implementing power modulation), as can be seen for example in the example of FIG. 2 which will be described below. In other words, the heating means 110 is supplied via a switching converter 120 comprising a rectifier 140 rectifying the alternative current of the grid 2 into direct current and a chopper 130 controlled by the control module 12 so as to adjust the power of the heating means 110.

It is to be noted that power modulation is possibly followed by a second DC-AC conversion at the output of the chopper 130 (thanks to a converter called an inverter), but it will be understood that the present converter 120 does not in any way implement a direct AC-AC conversion.

Switching converters have a far better output than linear converters, which avoids a waste of electricity and enables far smaller dimensions (avoiding the need of a large size dissipation radiator). On the other hand, a switching converter produces more high frequency harmonics. But, paradoxically, tests implemented by the Applicant have shown that for powers across the switching converter 120 (rated power of the associated heating means 110) above 1.2 kW, the harmonics produced upon chopping the direct current remain acceptable and the system meets the requirements of the electromagnetic compatibility (CEM) standard, unlike what happens for other power device types such as dimmers (direct AC-AC converters only using operated semiconductors for example of the thyristor type, refer for example to the application EP0104979 which describes the supply of a water heater via a dimmer using a switched triac at a predetermined hour, and this in order to spread over time a power increase). Insofar as most CEJ-type systems have a power higher than 1.2 kW (typically 3 kW), the present switching converter 120 is optimum for this application.

Many switching converter types implementing an AC-DC conversion are known. Such a switching converter 120 is most often an electronic device comprising a rectifier part 140 and a chopper part 130, as explained above. The rectifier part 140 enables the AC-DC conversion at the input, and typically comprises to do so a diode bridge (refer to FIG. 2). The chopper part 130 implements the electronic power modulation on direct current, and typically comprises at least one operated switching transistor 131 (in particular selected from the Metal Oxide Semiconductor Field Effect Transistors (MOSFET) and the Insulated Gate Bipolar Transistors (IGBT), a microcontroller 132 of said transistor 131 (for example an ASIC, "Application-Specific Integrated Circuit") connected to the control module 12, at least one diode 133 (a discrete and/or bridge diode) and at least one filtering reactive element 134 (in particular selected from the capacitors and the inductors).

In broad outline, the filtering reactive elements 134 act as ideal storing elements, and the high frequency switching of the transistor 131 results in alternating charges and discharges of these elements 134 (the diode(s) 133 prevent(s) the current from coming back), hence the delivery of a modulated power direct current. The microcontroller 132 determines the duty factor (that is the ratio of the time during which the transistor 131 is on and the time of a switching period) as a function of the desired power ratio and the characteristics of the components of the converter 120. It is called a power "electronic modulation".

Figure 2:
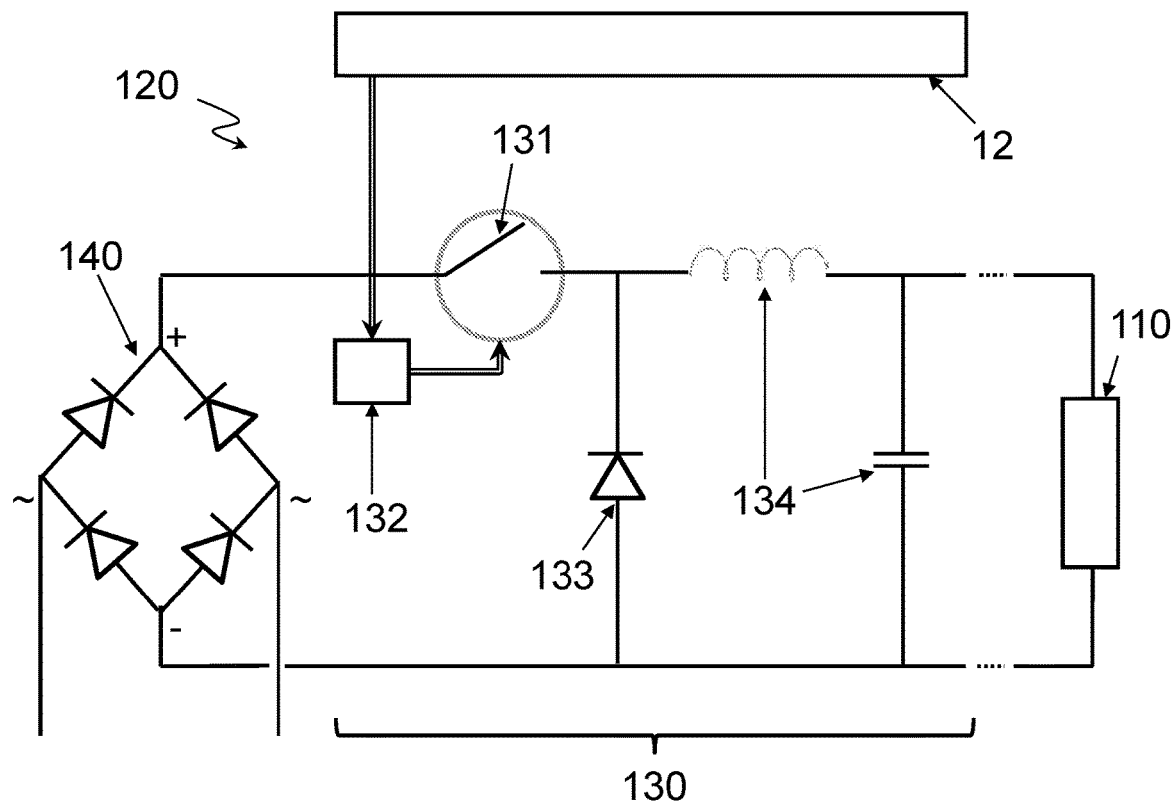
FIG. 2 is a diagram of an exemplary switching converter of a system according to the invention.

FIG. 2 depicts an exemplary basic switching converter 120. It comprises two elements 134 (a capacitor and an inductor) and a diode 133.

In the present system, the switching converter 120 alone enables the power of the whole heating device 11 to be adjusted in accordance with descriptive data of a state of said power grid 2 (see below). To do so, the switching converter 120 (and more precisely the chopper 130, insofar as the rectifier 140 is not operated) is controlled by the control module 12 so as to adjust the power of the heating means 110 it supplies. Controlling means that the control module 12 is adapted to determine and impose the power ratio A of the switching converter 120 in accordance with the set points it receives. It thus become possible to easily and simply adjust the power of the heating device 11 while being able to operate it at any power between 0 and the maximum rated power, and this while limiting the harmonics. Moreover, as explained, the system has a good output, is reliable and not bulky.

The power adjustment mechanism thus enables the installed water heaters to be easily and efficiently used to manage the power production of renewable origin: modifying the effective power of the heating means 110 indeed makes it possible to increase or reduce on request the consumption of these water heaters and to act on the energy stored as hot water. The energy capacity becomes adjustable. Several TWh are thus available across the French territory for example. It is not be noted that it is thus easy to modify an existing water heater by simply inserting the switching converter 120 between the 230V power supply and the heating means, and this without making the electrical installation more complex.

For example this enables the power consumption to be favoured as long as the photovoltaics is widely available, and the power consumption to be limited or other energies to be chosen (for example via alternative heating means such as burners if the device 11 comprises the same), when there is a deficit in the photovoltaics.

For example, during a water heating phase (and therefore a temperature raising of the tank 10), the power can be increased, which heats water more quickly. Thus, more electricity is consumed, this electricity being stored as heat capacity of water (4185 $J \cdot kg^{-1} \cdot K^{-1}$).

The energy capacity of the tank 10 indeed means the maximum amount of energy that can be stored in thermal form via the hot water.

Referring back to FIG. 1, the system advantageously comprises a short-circuit means 150 of the switching converter 120 controlled by the control module 12. In other words, the system 1 can comprise a parallel branch fitted with a relay-type power device (especially a static relay for example of the thyristor type). This short-circuit means 150 makes it possible, when it is on, to bypass the switching converter 120 and to directly supply the heating means 110 (in other words to perform a "bypass" of the converter 120) when no power correction is required. Preferably, the system comprises no other power device than the switching converter 120 and a relay on a possible short-circuit means 150.

Managing Mechanism

The descriptive data of the state of the power grid 2 can be directly transmitted to the control module 12. But preferably, the control module is a standard equipment, and the system 1 further comprises a managing element 30 connected to the control module 12. This managing element 30 is configured to control the control module 12 in accordance at least with descriptive data of a state of said power grid 2.

In other words, the managing element 30 acts as a module for pre-processing the descriptive data of the state of the grid 2.

The managing element 30 is integrated into a control module 12 of an existing CEJ, and does not require any structural modification. In particular, only few modifications of the control module 12 perform a "post-processing" (we will see later what it is). It is thus easy and inexpensive to modify the existing equipment. In the case of new water heaters, the managing element 30 can be directly integrated into the control module 12 as an additional function in order to suppress the need for an additional appliance (in other words the control module 12 directly processes the descriptive data of the state of the power grid 2).

This data generally refer to all the information about the load of the grid 2, the rate of energy of renewable origin, the variation predictions of this rate, the production/consumption in general, etc.

This data can be locally obtained generic data, for example of weather forecast origin, which can indicate to which extent the production means of renewable energy will be productive, but preferably there are more complex data provided from a communication network 3 (typically the Internet network) via an appliance 31, in particular in real time.

In a first embodiment, the appliance 31 is a smart electric meter (for example LINKY) having a Customer Information System (CIS) emitter which is integrated or not. The used data can especially be fields of the CIS such as for example: the binary state of one or more virtual contact(s), the pricing index of the current supplier and/or operator, the price of electricity, the notice of a moving peak and/or one or more moving peak(s), etc.

In a second embodiment, the appliance 31 is an Internet access equipment of the "box" type of an Internet access provider. The appliance 31 is connected to the managing element 30 by network connexion means such as Wi-Fi, an Ethernet link, CPL, etc. The data can then be full weather forecast data (wind speed, sunshine, etc.), pre-processed data on servers of an electricity supplier to optimise the overall load, etc.

In a third embodiment, the appliance 31 is an energy manager connected via a wire/radio link to one or more electric meters associated with production points of energy of renewable origin (in particular if the energy of renewable origin has one or more dedicated local delivery point). The link can be uni- or bi-directional. The access to meters enables a full real time follow-up of the production of energy of photovoltaic origin and of the consumption of the accommodation(s).

The present invention is not limited to one type of descriptive data of a state of said power grid 2, nor to one way of providing this data.

Oversupply and Under-Supply Modes

According to a preferred embodiment, the managing element 30 determines a power set point (that is an effective power target value) in accordance with the descriptive data of the state of the grid 2. The control module 12 then controls each power device in accordance with a power set point issued by the managing element 30.

In particular, the managing element 30 implements a first and/or a second operation type.

The first is the "oversupply" mode (in other words "manual override") used to increase the consumption of the CEJ and therefore the amount of stored energy. In this mode, the managing element 30 is configured to issue a power increase set point (in other words a power set point increasing the consumption of the heating means 110) when the descriptive data of a state of said power grid 2 are characteristic of a present excess amount and/or of a future deficit of energy (of renewable origin or not) within said power grid 2 (in other words if the production of renewable origin is falling in the short term), so as to increase the energy capacity of the water tank 10.

This oversupply mode is interesting either to absorb a strong photovoltaic production, or for a prediction of poor production. Thanks to the oversupply, the effect of the device 10 is amplified. This therefore increases the immediate consumption, but limits the future consumption (since more energy is stored, the next crossing of the first temperature threshold is delayed).

The power set point value can be such as to consume the energy surplus of renewable origin as much as possible without using the energy of non-renewable origin. The value can also be a fixed value, or the present consumption value plus a predetermined deviation (for example +500 W).

It is to be noted that certain options can complete this oversupply mode: if the data triggering the oversupply are provided by a meter fitted with a CIS module, the latter can temporarily increase the cut-off power value, simultaneously to powering on the water heater, to avoid any tripping risk in the absence of a load shedding device or energy manager. Moreover, if the water heating system depends on the pricing signal via a dry or virtual contact, the latter must be driven so as to enable the power supply of this system outside the allowed normal time slots if necessary. Furthermore, if the downstream points for drawing off the domestic hot water (shower, taps, etc.) are not all fitted with a mixer tap, the addition of a mixing valve at the outlet of the tank 10 enables the burn risks due to the provision of hotter water to be avoided.

The second mode is the "under-supply" mode (in other words, "reduced operation") used to decrease the consumption of the CEJ and therefore the amount of stored energy. In this mode, the managing element 30 is configured to issue a power decrease set point (in other words a power set point decreasing the consumption of the heating means 110), when the descriptive data of a state of said power grid 2 are characteristic of a present deficit and/or a future excess amount of energy of renewable origin within said power grid 2 (in other words if the production of renewable origin is rising in the short term), so as to decrease the energy capacity of the water tank 10.

This can be very useful in anticipation of a production peak of energy of renewable origin or during a consumption peak. It is thus avoided consuming fossil energy while knowing that the renewable energy will soon be in excess. This voluntary consumption drop is called the electrical load management.

The power drop set point can be calculated so as to minimise a consumption energy of non-renewable origin. The idea is to not draw off energy of non-renewable origin from the grid 2 (or as little as possible). It can also be a fixed value, or the present consumption value minus a predetermined deviation (for example −500 W).

It is to be noted that both modes (reduced operation and manual override) can coexist and be implemented in turn. In both modes, the application of the power set point can be preceded and/or followed by a ramp to avoid a bouncing effect; in other words the power set point is gradually increased/reduced (for example linearly over an interval of 30 minutes), instead of being immediately changed.

Furthermore, the activation of either mode, the selection of a fixed or variable power set point, the temperature thresholds, etc., can be controlled by the user via an appropriate interface.

It is also to be noted that the power adjustment cannot be made to the detriment of the user's comfort, and for each of the modes, the control module 12 can be configured to ignore the power set point when a temperature of the water in the tank 10 (measured by a probe 20 connected to the control module 12) is lower than the first predefined threshold (for the second mode) or higher than a second predefined threshold (for the first mode).

Operation of the Managing Element

The managing element 30 can comprise a data processing module (a processor) configured to receive said descriptive data of a state of said power grid 2 and generate the power set point to the control module 12. If the control module 12 is an evolved electronic board already comprising a processor, the managing element 30 can be, as explained, a software module directly implemented by the control module 12.

Driving of the Switching Converter

As explained, the control module 12 determines the power ratios A of the switching converter 120 in accordance with the power set point it receives. In other words, it computes the values of these ratios to be such that the effective power corresponds to the power set point. Many algorithms can be used to determine these values.

It can furthermore be provided that in the case of no received power set point, the control module 12 activates the short circuit means 130 so as to no longer implement the power adjustment.

Method

According to a second aspect, the invention also relates to a method for modifying the consumption of an electric heating device implementing by the system 1 according to the first aspect of the invention (and more precisely a method for modifying the energy capacity of a water tank 10 if the system 1 is a water heater).

This method comprises the steps of:
- receiving descriptive data of a state of an AC power grid 2 (as explained for example from an appliance 31);
- generating by a managing element 30 a power set point in accordance at least with said descriptive data of a state of said power grid 2;
- issuing said set point to a control module 12 of a heating means 110 of the heating device 11 (in particular a device for heating 11 the water in the tank 10, but it will be understood that if the system 1 is a conventional heating system, the device 11 can heat ambient air or another fluid), the heating means 11 being supplied by the power grid 2 via a switching converter 120 rectifying the alternating current of the grid 2 into direct current;
- controlling by the control module 12 the switching converter 120 (in particular a chopper 130 of the converter 120) in accordance with the power set point so as to adjust the power of the heating means 110 (this step consists in determining the power ratio A).

It is reminded that the managing element 30 can only be a functionality integrated into the control module 12 (which then directly receives the descriptive data of the state of the grid 2).

According to the first previously described operating mode, the system 1 is in "oversupply" mode. This mode is triggered when the descriptive data of a state of said power grid 2 are characteristic of a present excess amount and/or a future deficit of energy of renewable origin within said power grid 2.

The power set point is a set point for increasing the consumption of the heating means 110, so as to increase the energy capacity of the tank 10.

According to the second previously described operating mode, the system 1 is in "under-supply" mode. This mode is triggered when the descriptive data of a state of said power grid 2 are characteristic of a present deficit and/or a future excess amount of energy of renewable origin within said power grid 2.

The power set point is then a set point for decreasing the consumption of the heating means 110, so as to decrease the energy capacity of the tank 10.

The invention claimed is:

1. A system comprising:
    a heating device comprising at least one heating means supplied by an AC power grid;
    a control module for controlling said heating device;
    a water tank, the heating device heating the water of the tank;
    the system being characterised in that the heating means is supplied via a switching converter rectifying the alternating current of the grid into direct current, the switching converter being controlled by the control module in accordance at least with descriptive data of a state of said power grid, so as to adjust the power of the heating means;
    wherein the control module controls each power device in accordance with a power set point issued by a managing element, wherein the managing element is:
    configured to issue a power set point reducing the consumption of the heating means when the descriptive data of a state of said power grid are characteristic of a present deficit and/or of a future excess amount of energy of renewable origin within said power grid, so as to reduce the energy capacity of the tank, and/or
    configured to issue a power set point increasing the consumption of the heating means when the descriptive data of a state of said power grid are characteristic of a present excess amount and/or a future deficit of energy of renewable origin within said power grid, so as to increase the energy capacity of the tank.

2. The system according to claim 1, wherein the control module is configured to ignore the power set point when a temperature of the water in the tank is lower than a first predefined threshold.

3. The system according to claim 1, wherein the control module is configured to ignore the power set point when a temperature of the water in the tank is higher than a second predefined threshold.

4. The system according to claim 1, further comprising an appliance receiving said descriptive data of a state of said power grid from a communication network, the appliance being connected to said managing element or to the control module.

5. The system according to claim 1, wherein the heating means has a rated power higher than 1.2 kW.

6. The system according to claim 1, wherein the switching converter comprises a rectifier and a chopper.

7. The system according to claim 6, wherein the rectifier of the switching converter comprises a diode bridge.

8. The system according to claim 6, wherein the chopper of the switching converter comprises at least one operated switching transistor, a microcontroller of said transistor connected to the control module, at least one diode, and at least one filtering reactive element.

9. The system according to claim 8, wherein each operated switching transistor is selected from the metal oxide semiconducting field effect transistors (MOSFET) and the insulated gate bipolar transistors (IGBT), and each filtering reactive element is selected from the capacitors and inductors.

10. The system according to claim 1, further comprising a short-circuit means of the switching converter controlled by the control module.

11. A method for modifying the consumption of a heating device heating the water of a tank, the method being characterised in that it comprises the steps of:
    receiving descriptive data of a state of an AC power grid;
    generating by a managing element a power set point in accordance at least with said descriptive data of a state of said power grid;
    issuing said set point to a control module of a heating means of the heating device, the heating means being supplied by the power grid via a switching converter rectifying the alternating current of the grid into direct current;
    controlling by the control module the switching converter in accordance with the power set point so as to adjust the power of the heating means
    wherein the managing element is:
    configured to issue a power set point reducing the consumption of the heating means when the descriptive data of a state of said power grid are characteristic of a present deficit and/or of a future excess amount of energy of renewable origin within said power grid, so as to reduce the energy capacity of the tank, and/or
    configured to issue a power set point increasing the consumption of the heating means when the descriptive data of a state of said power grid are characteristic of a present excess amount and/or a future deficit of energy of renewable origin within said power grid, so as to increase the energy capacity of the tank.

\* \* \* \* \*